INVENTOR.
HERBERT RANGGER

United States Patent Office 3,473,717
Patented Oct. 21, 1969

3,473,717
DEVICE FOR SECURING ELEMENTS INTO
HARD SURFACES
Herbert Rangger, Frastanz, Austria, assignor to Hilti
Aktiengesellschaft, Schaan Furstentum, Liechtenstein
Filed Nov. 18, 1966, Ser. No. 595,521
Claims priority, application Germany, Dec. 6, 1965,
H 57,883
Int. Cl. B21j 15/28; B27f 7/06; B25c 1/10
U.S. Cl. 227—8                                    6 Claims

ABSTRACT OF THE DISCLOSURE

An apparatus for driving bolts, nails and similar securing or anchoring devices into hard receiving material is operated by the force of an explosive charge to force a thrust piston to drive the anchoring element into the hard receiving material. The construction includes a sleeve member which is axially and rotatably movable in an outer guide tube and which includes a vent opening at its upper end. An anvil member having a striking head at its outer or upper end is slidable in the sleeve member and has a lower end which extends into a recessed end of the thrust piston. In addition, it defines a cartridge chamber for receiving a cartridge in its end face. The explosion of the cartridge forms a pressure wave within the space defined within the recessed end of the thrust piston. A gas passage for the escape of the pressure gases is defined between the anvil member and the sleeve and an additional gas passage is defined between the exterior of the sleeve and the guide tube. The lower portion of the sleeve is provided with a flange having a plurality of grooves defined thereon which extend from the lower end upwardly to the gas passage space defined between the tube and the sleeve so that some of the pressure gases may escape upwardly to the vent opening after a sufficient force is imparted to the piston to cause it to drive the anchoring element into the hard receiving material.

SUMMARY OF THE INVENTION

This invention relates, in general, to devices for driving securing elements into hard surfaces and, in particular, to a new and useful setting device which is driven by an explosive charge force, and to an improved mechanism for absorbing the impact force and for cleaning the interior of the device or powder remnants during each explosion.

The invention provides a device which includes a thrust piston having an outer end adapted to carry a bolt, nail or similar securing device which is adapted to be driven into a hard surface. The thrust piston is slidable in a guide tube which, in accordance with a feature of the present invention, includes a sleeve member which is also slidable and rotatable within the guide tube and which will abut an edge of the piston member in a limit position. The device includes means for preventing ignition of a cartridge contained in an anvil member which is also slidable in the sleeve, but the present invention provides means for insuring an even absorption of the explosive charge when the cartridge is fired and for providing a movement of the parts to insure the cleaning thereof during each explosion. For this purpose, the anvil piston is provided with a flanged lower end having grooves extending obliquely from the circumference thereof up to a plurality of passages defined by grooves in the anvil piston at the circumference thereof which faces the sleeve. The construction is such that the parts are rotated relatively during each explosion and the gases are directed up the oblique passages and along the longitudinally extending grooves in order to evenly dissipate the forces set up and to provide a cleaning and wiping action as this takes place.

The invention thus provides an improvement over prior art devices which have a tendency to become fouled after a few shots have been fired so that the parts would become frozen and inoperative. The present invention provides means for discharging the gases easily and preferably automatically after each explosion. In addition, because the device includes many grooves defined around the periphery of the anvil member and along its length, the explosive pressure of several thousand atmospheres which acts initially on the front of the anvil member will not destroy the anvil member or its surrounding sleeve. With the present construction there is no likelihood that the sleeve or the thurst piston with the drive pin will be hurled to an abutment on the device to cause destruction of either of these parts.

Accordingly, it is an object of the present invention to provide an improved device for driving securing devices into hard materials which includes an anvil member which is adapted to carry a cartridge which may be exploded between the anvil member and a thrust piston, the thrust piston being constructed to carry the device to be driven into the hard material; and wherein means are privided for permitting expansion of the explosive gases between the anvil member and the piston which includes means for dissipating the forces as well as for providing relative movement and preferably rotation between the anvil member and an associated sleeve in which it is mounted so that the parts will be continuously wiped clean and will easily move relatively without causing any destructive action.

A further object of the invention is to provide a gun for driving home securing devices into hard materials which includes means for dissipating the explosive force of the firing cartridge and also for insuring that the parts will be moved relatively and contacted by high velocity gases for providing a cleaning and wiping action therebetween.

A further object of the invention is to provide a device for setting fastening devices into hard foundations and the like by an explosive force which is simple, in design, rugged in construction and economical to manufacture.

The various features of novelty which characterize the invention are pointed out with particularity in the claims annexed to and forming part of this specification. For a better understanding of the inveniton, its operating advantages and specific objects attained by its use, reference should be had to the accompanying drawings and descriptive matter in which there are illustrated and described preferred embodiments of the invention.

Figure 1:
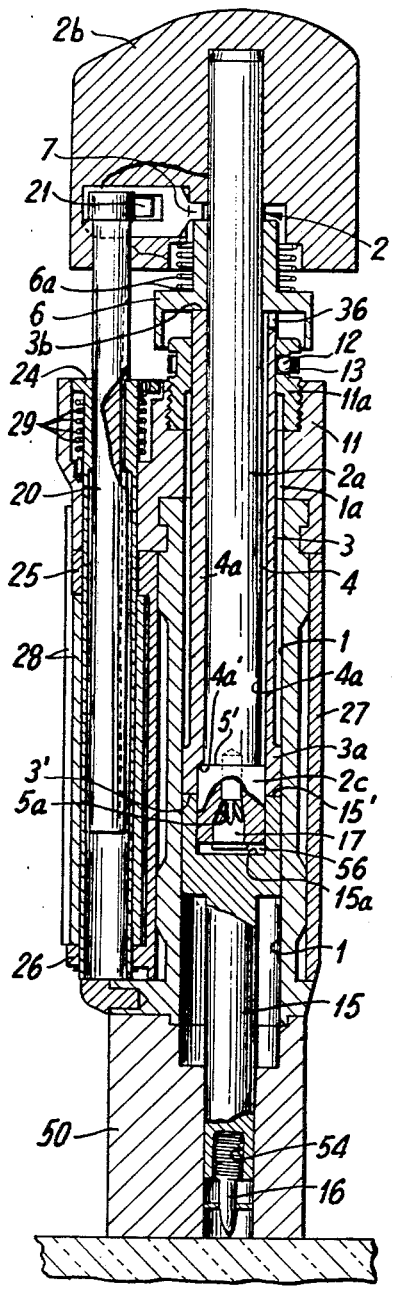
FIG. 1 is a longitudinal sectional view through a bolt gun setting device constructed in accordance with the invention.

Referring to the drawings, in particular, the invention embodied therein comprises a gun or tool for setting securing elements such as bolts, nails, etc. into a hard material such as a concrete wall or floor. The gun comprises a body assembly which includes a guide tube 1 which is connected at its upper end to an upper housing part 11 and at its lower end to a setting 50. The block 50 together with the guide tube 1, constitutes the lower part of the housing. The guide tube 1 defines together with a sleeve an expansion chamber 1a to permit expansion of the explosion gases after ignition of the cartridge. The expansion zone is thus defined in the present case as the zone in which the gases expand after they have escaped from the explosion or pressure zone.

The pressure zone is located between an end face of an anvil member generally designated 2 and a thrust piston 15. The anvil member 2 is axially slidable within limits within the sleeve 3 and it includes a piston portion 2a which is connected at its upper end to a striking head 2b. The lower end of the piston portion 2a is formed as a widened piston portion 2c. The widened portion 2c is slidable within a cylindrical recess 56 formed at the upper end of the thrust piston 15 which is slidable within the guide tube 1. The lower end of the widened piston portion 2c of the anvil member 2 is provided with a cavity 5a for receiving a cartridge 17. The cartridge 17 is normally exploded upon the relative movement of the anvil member 2 and the thrust piston 15 together to cause igniting means carried on an inner flat wall 15a of the recess 56 to strike the cartridge 17 and to cause the explosion thereof.

The anvil member 2 is surrounded by a sleeve 3 having a lower end 3a which abuts against an annular upper end 15' of the thrust piston 15. The lower end of the sleeve 3 includes a bore 4a which is widened interiorly to form an interior shoulder 15' which abuts against a shoulder 5' formed at the juncture of the widened piston portion 2c and the piston portion 2a of the anvil member 2. The shoulder 4a' forms a stop for the anvil member 2 when it abuts against the shoulder 5' and the contact of the end 3a of the sleeve 3 with the thrust piston end 4a' prevents the anvil member 2 from being moved downwardly beyond the position indicated in FIG. 1 when the tube is in a safety condition. The housing of the device is made in two parts and includes the lower part formed by the guide tube 1 and the block 50 and an upper part formed by upper housing part 11. In addition, there is an outer housing part 27. The upper housing part 11 carries a sleeve element 11a which has a plurality of recesses in which are positioned balls 12 which are biased by a ring clamp 13 into frictional engagement with the sleeve 3 in the manner of a friction guide.

When the instrument is to be used, a securing element, for example, a bolt 16 having a pointed penetrating end and a threaded upper end, is inserted into a receiving chamber 54 in the lower end of the thrust piston 15. The thrust piston 15 can then be pushed backwardly in the body 15 and the guide tube 1 until it reaches the position indicated in FIG. 1 in which it abuts against the lower end of the sleeve 3. In this position, the threaded bolt 16 will be oriented with its tip at the outer end of the body 50 positioned against the hard material into which it is to be directed. The pressure zone space corresponds to the cylindrical space 56 which is defined between the end face of the thrust piston 15 and the wall 15a and the end face of the anvil member piston portion 2c and in the position indicated in FIG. 1 this space cannot be shortened because the device is in a safety condition. The safety arrangement prevents the movement of the anvil member 2 relative to the sleeve 3 so that there is no possibility that the cartridge 17 will be fired until it is desired to use the instrument.

The safety setting of the device is controlled by means of a control column 20 which includes an upper end which is rotatably mounted within the striking head 2b and which includes a radially extending control cam portion 21 which engages within a groove of a spacer member 7. The spacer member 7 is slidably mounted for radial displacement in the striking head 2b and may be moved along a recess therein into the blocking position at which an end is disposed between the anvil head 2b and a sleeve member 6 which is provided between the sleeve 3 and the anvil head 2b. In the construction illustrated, the sleeve member 6 is a separate part but it may be formed as an extension of the sleeve 3. In the position indicated in FIG. 1, an end face portion 3b of the sleeve 3 abuts the sleeve member 6. A compression spring 6a is compressed between the sleeve member 6 and the striking head 2b and insures that the sleeve 3 will always be urged to a position in which the shoulder 4a' engages the shoulder 5' so that the anvil member 2 will not be displaced toward the thrust piston 15 until the spacer member 7 is removed. With the spacer 7 in position between the anvil 2b and the sleeve 6, there will be no possibility of a further displacement between the anvil member 2 and the thrust piston 15.

Figure 2:
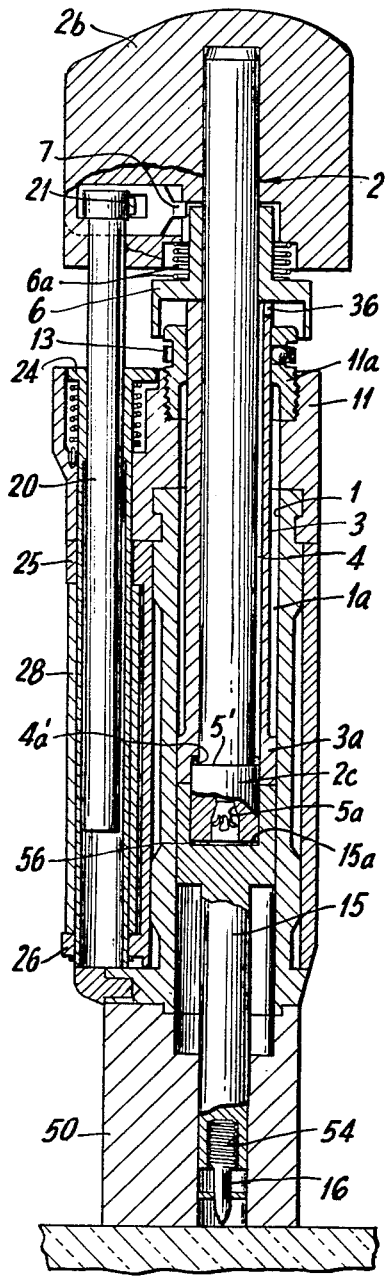
FIG. 2 is a view similar to FIG. 1 with the apparatus in a ready position.

In order to change the device from the safety condition indicated in FIG. 1 to the ready condition indicated in FIG. 2, it is necessary to rotate a control sleeve 24 by engaging a hand lever 25 connected thereto. The control sleeve 24 is secured to the control column 20 for rotation therewith so that the control column will be moved to shift the spacer 7 outwardly from a position in which it is disposed between the striking head 2b and the sleeve 6. This condition is indicated in FIG. 2. When this condition is achieved, then the anvil member 2 may be moved toward the wall 15a of the thrust piston 15 by an amount sufficient to cause explosion of the cartridge.

The control column 20 is axially displaceable within the control sleeve 24 but may not rotate in respect thereto. The control sleeve 24 is arranged in bearings 25 and 26 for pivotal movement about an axis parallel to the longitudinal axis of the anvil member 2. The bearings 25 and 26 are secured on the guide tube 1. A torsion spring 29 which is carried in a recess of the upper housing 11 acts on the sleeve 24 to bias the sleeve into a safety position.

The end of the sleeve 24 which protrudes beyond the upper sleeve bearing 25 serves as a pivot bearing for the control column which can be rotated outwardly with the upper housing portion separate from the lower housing portion.

Figure 3:
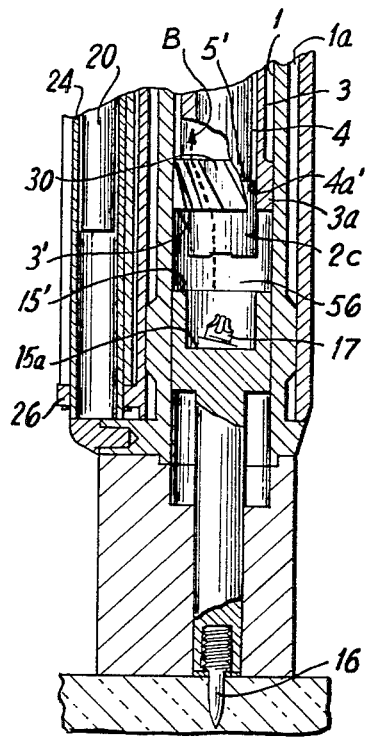
FIG. 3 is a partial sectional view similar to FIG. 1 indicating the exterior surface of the anvil piston and the cartridge after firing.
Figure 4:
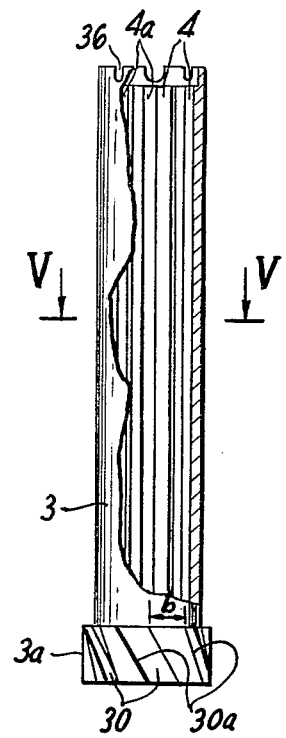
FIG. 4 is a partial elevational and partial sectional view of the sleeve construction.
Figure 5:
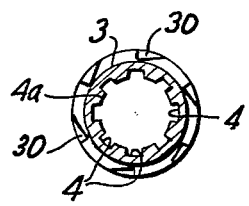
FIG. 5 is a section taken on the line V—V of FIG. 4.

As best seen in FIGS. 2, 3 and 4, the outer circumferential face of a lower end 3a of the sleeve 3 is formed with continuous grooves 30 having axes which are inclined in relation to the longitudinal axis of the sleeve 3. The grooves 30 are arranged at such an angle to the axis of the sleeve and at such a distance from each other that a vertical line projection will extend through each end of each groove edge 30a and the spring between the ends of each groove edge 30 is essentially equal to the distance b between adjacent grooves.

The sleeve 3 is traversed along its inner circumferential face by parallelly extending grooves 4 which are parallel to the longitudinal axis thereof. The groove webs 4a end a little above the lower edge 3', as indicated in FIG. 3 so that the sleeve 3 has in its lower portion a diameter enlarged in relation to the diameter of the upper portion of the sleeve by an amount which is about double the groove depth.

The device operates as follows:

With the parts in the safety condition, the spacing a between the lower end of the anvil member 2 and the thrust piston 15 is maintained by the spacer 7. The lever 28 is therefore actuated to rotate the control column 20 in order to move the spacer out of its blocking position when the device is to be used. When this is done, then the anvil member 2 may move further toward the piston 15, as indicated in FIG. 2, so that when the striking head is struck with a hammer, the ignition means carried on the surface 15a of the thrust piston will cause explosion of the cartridge. After ignition of the cartridge in the device in the position indicated in FIG. 2, the thrust piston 15 will be driven forwardly by the evolving explosion pressure so that the spring 6a may relax, and, because of this, there occurs a first relative movement between the sleeve 3 and the anvil member 2. This movement will continue until the shoulder 4a' of the sleeve 3 again contacts on the edge 5' of the piston portion 2c of the anvil member (see FIG. 3). At the same time, the anvil member 2 absorbs the reaction energy and moves upwardly and again takes along the sleeve 3 via the striking of the abutment 5' against the shoulder 4a'.

The explosion gases formed by the explosion of the cartridge take the following paths:

(a) A part of the gas escapes around the piston portion 2c of the anvil member and up the grooves 4 defined in the sleeve member 3. The gases flowing through the grooves 4 have a high velocity since the clearances are small. At the upper end, the gases are directed into the atmosphere out of the grooves 4 through the vents 36.

(b) As soon as the recess defined in the inner end of the thrust piston 15 clears the piston portion 2c of the anvil member 2, a major portion of the pressure gases impinges on the lower edge 3' of the end of the sleeve 3. As is evident from FIG. 3, the gases impinging on the front face 3' pass through the grooves 30 into the expansion chamber 1a formed between a sleeve 3 and the guide tube 1. This path of the gases is designated B in FIG. 3. Because of the inclination of the grooves 30, a change of direction is imparted to the gases flowing therethrough so that the powder residues are directed in a whirling fashion and are hurled against the inner wall of the guide tube 1.

As the device is reloaded, the anvil member piston 2a is pulled upwardly carrying sleeve 3 until the lower end 3a of the sleeve member 3 abuts against the sleeve 11a of the upper housing 11. During this movement of the piston 2a relatively to the pressure zone, the inclined groove edges 30a of the grooves 30 scrape off the powder residue particles which are hurled against the inner wall of the guide tube 1. In this position of the device, the closure 11 is opened by pivoting it outwardly from the lower portion of the housing so that the device can be reloaded by an insertion of the cartridge into the magazine chamber 5a. When the device is opened, the device is inverted so that the powder residue particles detach from the wall of the guide tube 1 and the sleeve 3 and drop out of the device. In this way, a permanent self-cleaning of the guideway between the sleeve 3 and the guide tube 1 is insured.

By arranging the grooves 30 so that they are inclined, there is a relative rotation between the sleeve 3 and the guide tube 1 during every shot so that a scraping of the powder residue particles which accrue on the piston portion 2a of the anvil member will take place. The residue particles which are on the interior grooves 4 will be hurled out of the grooves during the next explosion by the gases flowing through the grooves 4 at high velocity so that the residues be pased into the open through the apertures 36 in the sleeves 3.

Figure 6:
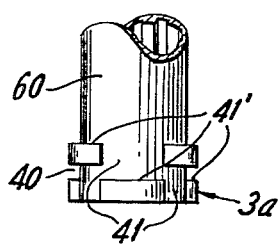
FIG. 6 is a partial elevational view of a portion of the sleeve of another embodiment of the invention.

In FIG. 6 another embodiment is shown which includes circumferentially arranged and spaced projections 41' which are carried at the lower end of a sleeve member 60 and which define transverse and longitudinal grooves 40 and 41 which extend perpendicular to each other. In this arrangement, gases will escape through the grooves 41 and the power residue particles will be scraped off by the edges of the projections 41'.

While specific embodiments of the invention have been shown and described in detail to illustrate the application of the inventive principles, it will be understood that the invention may be embodied otherwise without departing from such principles.

What is claimed is:

1. An apparatus for driving bolts, nails, and similar securing devices into a hard receiving material comprising a guide tube, a sleeve member axially and rotatably movable in said guide tube and having a vent opening, an anvil member slidable in said sleeve member and having a striking head at one end and an opposite inner end with means for holding a cartridge defined therein, a thrust piston having an inner end terminating at an inner wall with a cartridge firing means and having an opposite outer end with means for holding the device to be driven into the hard receiving material, said anvil member and said sleeve together defining at least one relatively small first explosive gas flow passage therebetween extending from said thrust piston inner wall to said vent opening on said sleeve member, the exterior of said sleeve and said guide tube defining a second explosive gas flow passage with the interior of said guide tube, said sleeve having a bore which is interiorly widened and defines a passage between said sleeve and said guide tube, said sleeve having an exterior portion substantially equal to the interior diameter of said guide tube and forming a lower flange, said lower flange having at least one circumferential groove extending from the lower end upwardly to the space between said guide tube and said sleeve.

2. An apparatus according to claim 1, wherein said groove is inclined in respect to the longitudinal axis of said sleeve.

3. An apparatus according to claim 1, wherein said sleeve is provided with a widned flange portion adjacent its inner end, the inner wall of said sleeve being in sliding contact with said anvil member and having a longitudinal groove defined therealong extending to said vent opening, the exterior of said flange portion of said sleeve having at least one groove defined therein extending upwardly from an inner end to the space between said sleeve and said guide tube.

4. An apparatus according to claim 1, wherein said sleeve is provided with a widened flange portion adjacent its inner end, the inner wall of said sleeve being in sliding contact with said anvil member and having a longitudinal groove defined therealong extending to said vent opening, the exterior of said flange portion of said sleeve having at least one groove defined therein extending upwardly from an inner end to the space between said sleeve and said guide tube, said piston having a recess defined at its inner end with said inner wall forming the inner end of said recess, said anvil member having a widened piston portion which is slidable in the recess of said thrust piston, said anvil member defining a ledge at its widened piston portion which abuts against an interior ledge formed in said sleeve member, said thrust piston being displaceable after explosion of said cartridge away from the piston end of said anvil member, the explosive gases being able to escape along said exterior groove of said piston member upwardly in the passage defined between said sleeve member and said anvil member and in addition the explosive gases being movable around the exterior of said sleeve member after said thrust piston is moved away from said anvil member and said sleeve to bring said anvil member out of the recess of said thrust piston.

5. An apparatus according to claim 1, including means biasing said sleeve member away from said striker head to cause engagement of said sleeve member with said anvil member when said thrust piston is in a firing position, and spacer means adapted to be positioned between said anvil member and said sleeve member to prevent the closing of said anvil member on said thrust piston and the firing of said cartridge.

6. An apparatus, for driving bolts, nails, and similar securing devices into a hard receiving material comprising a guide tube, a sleeve member axially and rotatably movable in said guide tube and having a vent opening, an anvil member slidable in said sleeve member and having a striking head at one end and an opposite inner end with means for holding a cartridge defined therein, a thrust piston having an inner end terminating at an inner wall with a cartridge firing means and having an opposite outer end with means for holding the device to be driven into the hard receiving material, said anvil member and said sleeve together defining at least one relatively small first explosive gas flow passage therebetween extending from said thrust piston inner wall to said vent opening on said sleeve member, the exterior of said sleeve and said guide tube defining a second explosive gas flow passage with the interior of said guide tube, said sleeve having a widened flange portion adjacent its inner end, the inner wall of said sleeve being in sliding contact with said anvil member and having a longitudinal groove defined therealong extending to said vent opening, the exterior of said flange portion of said sleeve having at least one groove defined therein extending upwardly from an inner end to the space between said sleeve and said guide tube, said piston having a recess defined at its inner end, with said inner wall forming the inner end of said recess, said anvil member having a widened piston portion which is slidable in the recess of said thrust piston, said anvil member defining a ledge at its widened piston portion which abuts against an interior ledge formed in said sleeve member, said thrust piston being displaceable after explosion of said cartridge away from the piston end of said anvil member, the explosive gases being able to escape along said exterior groove of said piston member upwardly in the passage defined between said sleeve member and said anvil member and in addition gases being movable around the exterior of said sleeve member after said thrust piston is moved initially up to the space between said sleeve member and said guide tube, a flange sleeve disposed between said striking head and said sleeve member, spring means biasing said flange sleeve away from said striking head toward said sleeve member and safety means including a spacer adapted to be positioned between said flange sleeve and said striking head and preventing movement of said anvil member to engage said thrust piston in a wall, and means for disengaging said safety means.

References Cited
UNITED STATES PATENTS

| | | | |
|---|---|---|---|
| 3,105,238 | 10/1963 | Hilti | 227—10 |
| 3,112,487 | 12/1963 | Hilti | 227—10 |
| 3,129,429 | 4/1964 | Hilti | 227—10 |

GRANVILLE Y. CUSTER, JR., Primary Examiner

U.S. Cl. X.R.

227—10